M. T. DAVIS, Jr.
FASTENING FOR HUB COVERS AND THE LIKE.
APPLICATION FILED JULY 26, 1917.
1,257,585.
Patented Feb. 26, 1918.
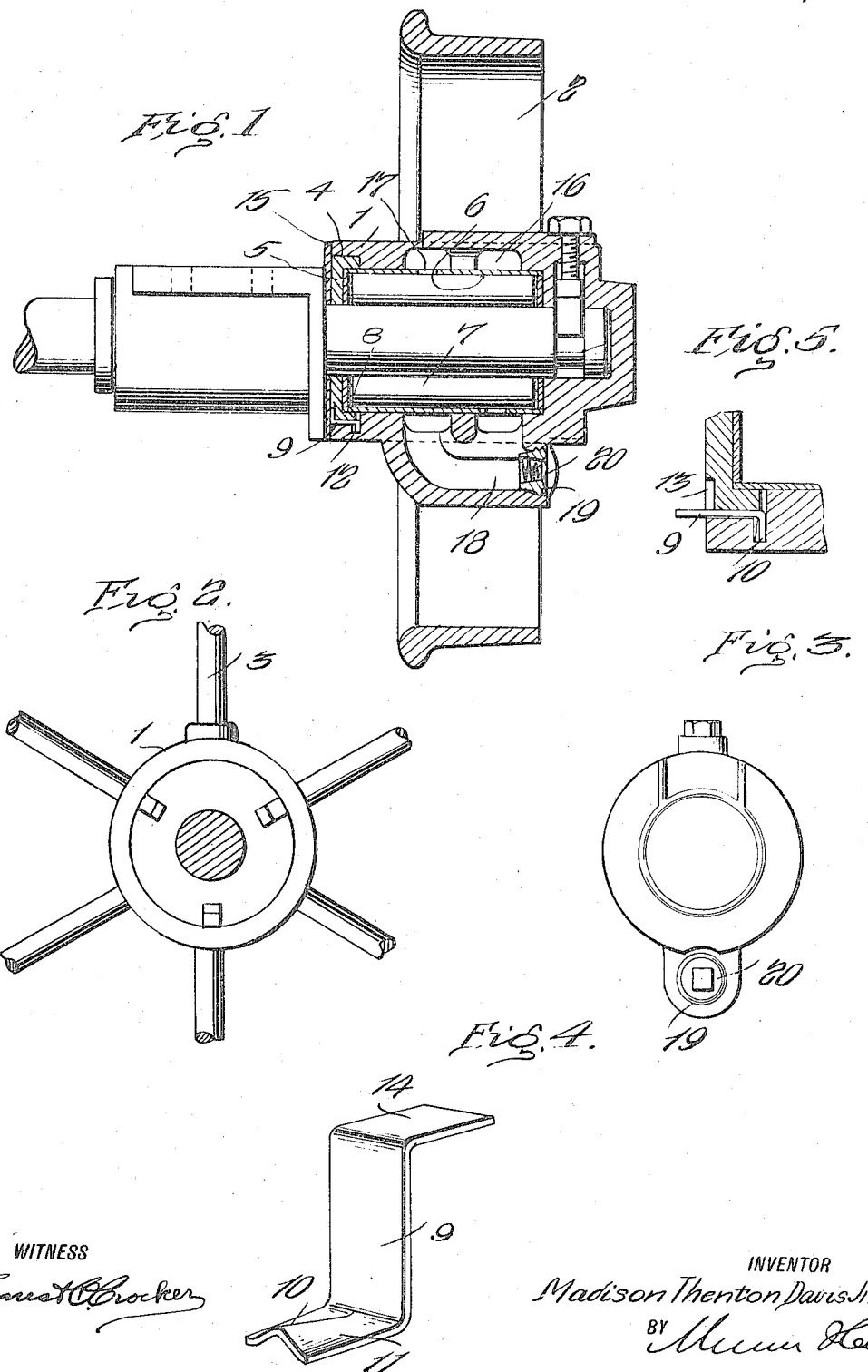
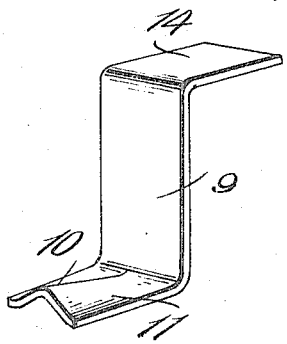
WITNESS
Ernest C Crocker
INVENTOR
Madison Thenton Davis Jr.
BY
Munn & Co.
ATTORNEYS

UNITED STATES PATENT OFFICE.

MADISON THENTON DAVIS, JR., OF CHARLESTON, WEST VIRGINIA, ASSIGNOR TO KANAWHA MANUFACTURING COMPANY, OF CHARLESTON, WEST VIRGINIA.

FASTENING FOR HUB-COVERS AND THE LIKE.

1,257,585.            Specification of Letters Patent.      Patented Feb. 26, 1918.

Application filed July 26, 1917. Serial No. 182,897.

*To all whom it may concern:*

Be it known that I, MADISON T. DAVIS, Jr., a citizen of the United States, and a resident of Charleston, in the county of Kanawha and State of West Virginia, have invented new and useful Improvements in Fastenings for Hub-Covers and the like, of which the following is a specification.

My invention is an improvement in fastenings for hub covers and the like, wherein the fastener is so arranged that the cap or cover for the hub will be held firmly in place, yet with some resiliency, and flush with or within the hub, so that the thrust of the hub comes directly against the bearing box of the axle and not against the hub cover.

In the drawings:

Figure 1 is a vertical section through a hub provided with the improved fastening;

Fig. 2 is a view looking at the inner end of the hub;

Fig. 3 is a view looking at the outer end;

Fig. 4 is a perspective view of the fastener;

Fig. 5 is an enlarged detail of a portion of Fig. 1.

The present embodiment of the invention is shown in connection with the hub 1 of a wheel, comprising the said hub and a rim 2 which is connected to the wheel by spokes 3. At its inner end the hub is counterbored or reamed, as indicated at 4, to receive a cap 5 which fits over the end of the cage 6 for the roller bearing 7. This cap has a marginal flange 8, and the marginal flange fits within the counterbore, and the fastener, as shown in Fig. 4, comprises a strip 9 of metal having one end crimped longitudinally, as shown at 10. The said end is bent at approximately a right angle with respect to the body of the strip, as indicated at 11, and this portion 11 of the strip is adapted to be received in a radial recess 12 in the interior of the hub, at the inner edge or wall of the counterbored portion. The body 9 of the strip extends longitudinally of the hub between the cap and the counterbored portion of the hub, and the said body is of a length to extend beyond the end of the hub when the portion 11 is in the recess 12.

The cap or cover 5 has a radial notch or recess 13 in its outer face, at the point where the body of the strip extends out from the hub, the said notch being of sufficient depth to receive the strip, when the outer end of the body of the strip is bent upward, as indicated at 14, at approximately a right angle to the body. When the washer 15 is seated over the cap or cover the fastener is concealed, while at the same time there is no possibility of the cover becoming disengaged.

The hub is internally recessed, as shown at 16, for receiving a lubricant, and openings 17 are provided, leading from the chamber 16 to the roller bearing 7. At one portion of the wheel a passage 18 leads toward the outer face or front of the wheel, and this passage is normally closed by a threaded plug 19.

The plug is a valve casing having a spring controlled check valve 20 which is adapted to be opened by the spout of the oil can to permit the wheel to be oiled.

The crimping of the fastener provides a certain amount of resiliency, and also permits the recess 12 to be cored in the hub, since the recess may be larger than if the fastener were merely bent without crimping. With the recess too narrow to be cored it would necessarily have to be machined.

I claim:

1. A fastener for hub covers comprising in combination with the hub and the cover therefor, of a fastener comprising a strip of metal having one end crimped longitudinally of the strip and bent at an approximately right angle to the body of the strip, the interior of the hub at the cover end having a radial recess for receiving the crimped end, with the body extending longitudinally of the hub, said body being of a length to extend beyond the end of the hub, the cap having on its outer face a radial notch for receiving the extended end of the strip when the said end is bent at right angles to the body.

2. A fastener for hub covers comprising in combination with the hub and the cover therefor, of a fastener comprising a strip of metal having one end crimped longitudinally of the strip and bent at an approximate right angle to the body of the strip, said hub having an internal recess for receiving the crimped end and the strip being of a length to extend beyond the hub and adapted to be bent upwardly upon the cap.

3. A fastener for hub covers, comprising a strip of metal having one end crimped longitudinally of the strip and bent at an approximate right angle to the body of the strip, the other end being adapted to be bent at an approximate right angle in the other direction.

4. A fastener for hub covers comprising a strip of metal having one end crimped longitudinally of the strip and bent at an approximate right angle to the body of the strip, the other end of the strip being adapted to be bent upon the cap.

MADISON THENTON DAVIS, Jr.

Copies of this patent may be obtained for five cents each, by addressing the "Commissioner of Patents, Washington, D. C."